US007765314B2

(12) United States Patent
Okamoto

(10) Patent No.: US 7,765,314 B2
(45) Date of Patent: Jul. 27, 2010

(54) CONTENTS MANAGING APPARATUS AND PROGRAM FOR THE SAME

(75) Inventor: Tetsuo Okamoto, Hamamatsu (JP)

(73) Assignee: Yamaha Corporation (JP)

( * ) Notice: Subject to any disclaimer, the term of this patent is extended or adjusted under 35 U.S.C. 154(b) by 911 days.

(21) Appl. No.: 11/182,921

(22) Filed: Jul. 15, 2005

(65) Prior Publication Data

US 2006/0015815 A1 Jan. 19, 2006

(30) Foreign Application Priority Data

Jul. 16, 2004 (JP) ............................. 2004-210776

(51) Int. Cl.
*G06F 15/16* (2006.01)
*H04M 11/00* (2006.01)

(52) U.S. Cl. ..................... 709/231; 709/203; 379/101.1

(58) Field of Classification Search ................. 709/203, 709/231; 379/101.01; 84/645
See application file for complete search history.

(56) References Cited

U.S. PATENT DOCUMENTS 6,725,275 B2 * 4/2004 Eyal ........................... 709/231
6,807,534 B1 * 10/2004 Erickson ...................... 705/51
2003/0195974 A1 * 10/2003 Ronning et al. ............. 709/230
2004/0049648 A1 * 3/2004 Sato et al. .................... 711/164
2008/0156178 A1 * 7/2008 Georges et al. ............... 84/645

FOREIGN PATENT DOCUMENTS

JP 2002-358457 A 12/2002
JP 2003-76364 A 3/2003

OTHER PUBLICATIONS

Notification of Reasons for Refusal issued in corresponding Japanese patent application No. 2004-210776, dated Mar. 18, 2008.
Red Hat Linux 7.3; Magazine. Translation of relevant portions provided.
Notification of Reason(s) for Refusal issued in corresponding Japanese application No. 2004-210776, dated Aug. 5, 2008.

* cited by examiner

*Primary Examiner*—Peling A Shaw
(74) *Attorney, Agent, or Firm*—Rossi, Kimms & McDowell LLP

(57) ABSTRACT

When contents data is downloaded from a server or the like to be stored, part of the contents data being downloaded is read and analyzed or part of the contents data whose download has been completed is read and analyzed while the plural contents data are being continuously downloaded, so that identifying information relating to the contents data is obtained, and the identifying information is displayed on a display device. This makes it possible to easily confirm the contents data that is being downloaded.

10 Claims, 6 Drawing Sheets

CONTENTS MANAGING APPARATUS AND PROGRAM FOR THE SAME

BACKGROUND OF THE INVENTION

1. Field of the Invention

The invention relates to a contents managing apparatus for downloading and obtaining contents data such as tune data from an external device such as a server and from a recording medium to utilize the contents data, and to a program for causing a computer to function as the contents managing apparatus.

2. Description of the Related Art

In recent years, it has become possible to download contents data such as tune data not only from a removable recording medium such as a magnetic flexible disk and a CD-ROM but also from a distribution server via a network such as the Internet. Such contents data can be downloaded not only to a PC (personal computer) being a general-purpose computer, but also to an electronic musical instrument such as a synthesizer equipped with a specialized computer, a portable data terminal such as a cellular phone, or a karaoke machine.

JP2003-76364A, for example, discloses that tune-related contents are downloaded to an electronic musical apparatus, a client PC, a portable communication terminal, or the like from a distribution server on the Internet and purchased. According to this invention, the electronic musical apparatus or the like is connected with the distribution server to display a download page on its display part and a download command is transmitted from this download page, so that the tune-related contents such as an electronic musical score can be downloaded.

In such a conventional apparatus, however, though a data name is displayed on the display part when the contents are downloaded, it is displayed only as a row of English characters and numerals and does not give any clear idea of the contents thereof such as a name of a tune, so that it is difficult to recognize details of data represented by this name. Because of this, a user has to continue the download without having sufficient recognition of the data. Further, there still remains a local difference in the speed of communication lines, and in some cases, it takes a lot of time to download one contents data even with a normal size. Then, the user sometimes notices that this data is not desired data when utilizing the data after the completion of the download. There has been a problem that in such a case, download conditions have to be produced again and thereafter a lot of time has to be spent in downloading data again.

Moreover, even when a user wants to discontinue the download halfway through the download, it is difficult to know to which contents among the ordered contents the download has been completed, which makes it difficult to perform a discontinuation operation.

SUMMARY OF THE INVENTION

The invention was made to solve these problems, and its object is to enable a reliable and efficient download operation of contents data, and to make it possible to know to which contents data the download has been completed when the download is discontinued.

In order to achieve the above objects, a contents managing apparatus according to the invention includes: a contents data download device downloading contents data; a contents data memory device storing the downloaded contents data; a contents information analyzing device which reads and analyzes part of the contents data being downloaded by the contents data download device or reads and analyzes part of the contents data whose download has been completed while the plural contents data are being continuously downloaded by the contents data download device, to thereby obtain identifying information relating to the contents data; and an identifying information display device which displays the identifying information obtained by the contents information analyzing device.

The contents data download device may download contents data from a recording medium such as a flexible disk, an optical disk, or the like by using a recording device such as an attached disk drive device or may download contents data from an external device by being connected with the external device, but is particularly suitable for downloading contents data from a server via the Internet.

The contents data download device may include a device which downloads the contents data arbitrarily selected by a user or which automatically downloads the contents data when a predetermined condition is satisfied.

The contents data includes image data, program data, and the like, but the invention is especially effective when the contents data is tune data in a form of MIDI data.

The part of the contents data read and analyzed by the contents information analyzing device is preferably contents-related information provided in a header portion of the contents data. The contents-related information in the case of the tune data includes: a name of a musical composition, a composer or copyright information, and restriction information relating to the contents data (the number of times of copying or reproducing, restriction on display of a musical score, edit restriction, and so on).

Incidentally, the contents data download device is also capable of continuously downloading a plurality of contents data in sequence. In this case, the contents information display device preferably displays download statuses of the respective plural contents data as well.

The contents data memory device may be either a fixed-type memory device having a built-in recording medium such as a hard disk, or a removable-type memory device to/from which a recording medium such as a flexible disk, an optical disk, or a memory card is attachable/removable.

Further, a program according to the invention is a computer-readable program containing program instructions executable by a computer and causing said computer to execute: a process of downloading contents data; a process of storing the downloaded contents data; a process of reading and analyzing part of the contents data being downloaded by the process of downloading contents data, or reading and analyzing part of the contents data whose download has been completed while the plural contents data are being continuously downloaded by the process of downloading contents data, to thereby obtain identifying information relating to the contents data; and a process of displaying the identifying information.

The contents managing apparatus according to the invention is capable of displaying the identifying information relating to the contents data, the identifying information being obtained by reading and analyzing part of the contents data being downloaded, or by reading and analyzing part of the contents data whose download has been completed while the plural contents data are being continuously downloaded. Therefore, it is possible to confirm the contents data being downloaded, or to immediately confirm the contents of the contents data whose download has been completed while the plural contents data are being continuously downloaded. This allows a user to feel assured when waiting for the completion of the download of all the ordered contents data. Further, also when the download is to be discontinued halfway, it is easily known to which contents data the download has been completed and which data is cancelled, so that a discontinuation operation is facilitated.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, a preferred embodiment of the invention will be described with reference to the drawings.

Figure 1:
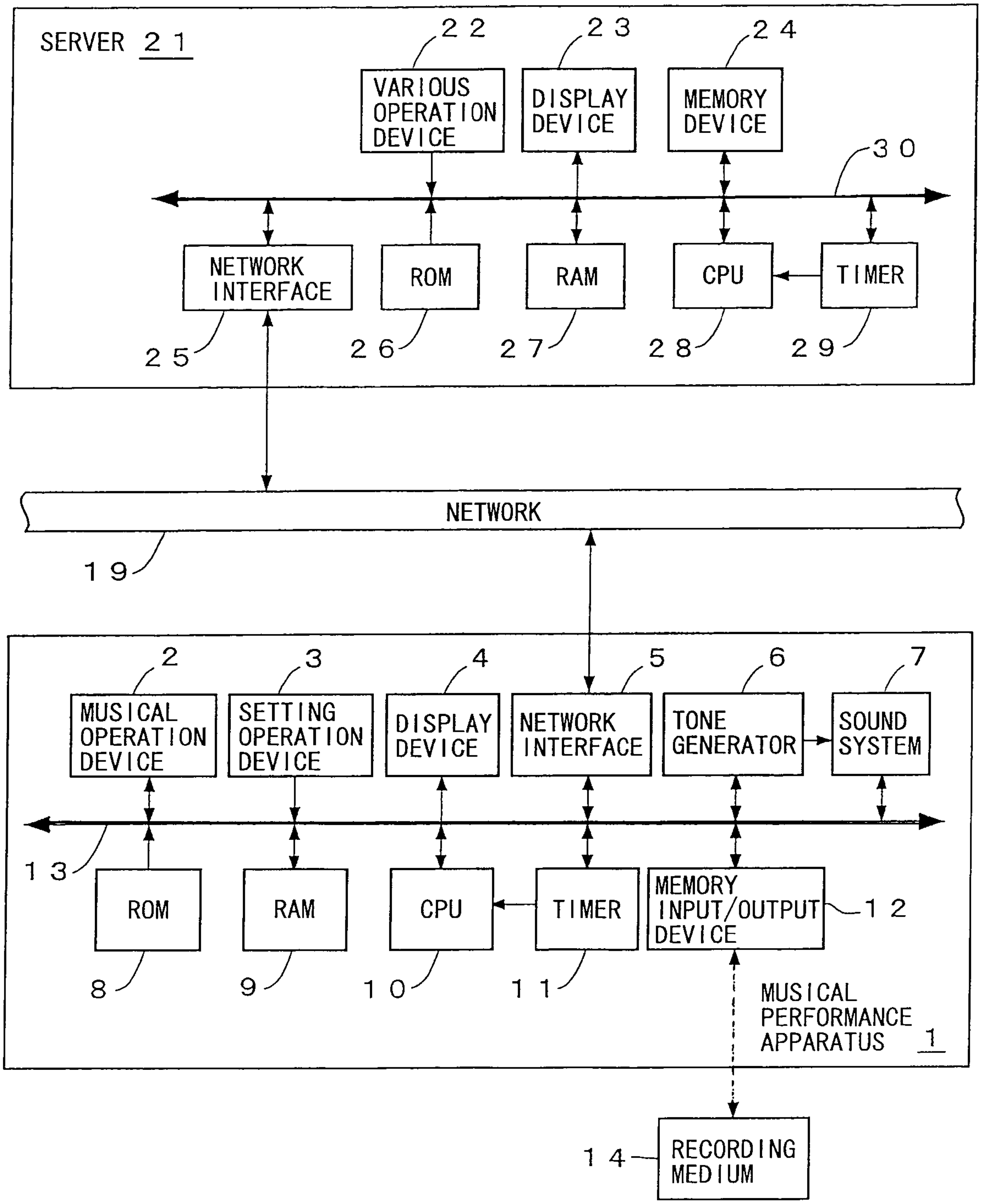
FIG. 1 is a system block diagram showing a state in which a musical performance apparatus being one embodiment of the contents managing apparatus according to the invention is connected with a server via a network.
Figure 2:
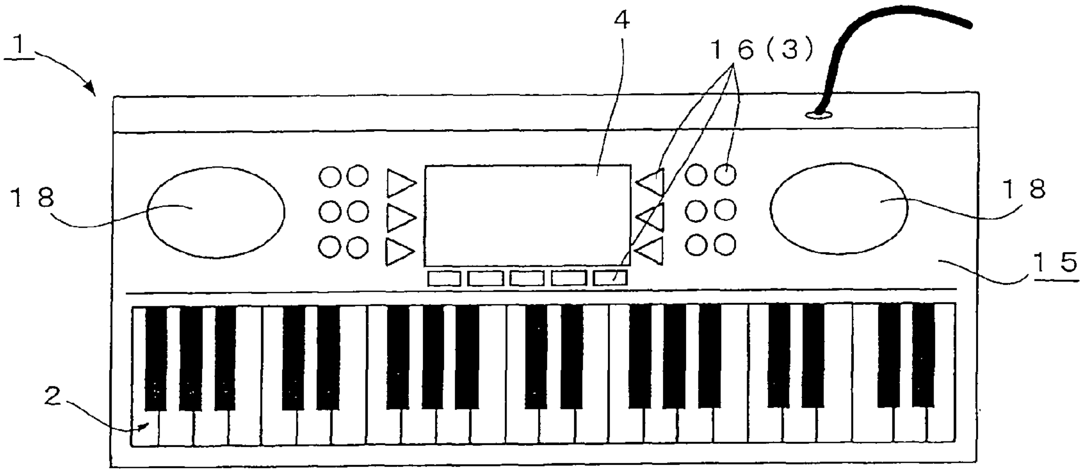
FIG. 2 is a plane view showing an outer appearance of the musical performance apparatus shown in FIG. 1.

First, a hardware configuration of one embodiment of a contents managing apparatus according to the invention will be described with reference to FIG. 1 and FIG. 2. FIG. 1 is a system block diagram showing a state in which a musical performance apparatus being the contents managing apparatus is connected with a server via a network. FIG. 2 is a plane view showing an example of the outer appearance of the musical performance apparatus.

The musical performance apparatus 1 is an electronic apparatus specialized in handling music such as an electronic musical instrument, for instance, a synthesizer, but a general-purpose electronic apparatus such as a personal computer can be also used.

First, a configuration of the musical performance apparatus 1 will be described. As shown in FIG. 1, the musical performance apparatus 1 includes: a musical operation device 2; a setting operation device 3; a display device 4; a network interface 5; a tone generator 6; a sound system 7; a ROM 8, a RAM 9, a CPU 10, and a timer 11 which constitute a signal processor; and a memory input/output device 12, and they are connected with one another by a system bus 13. Further, a movable recording medium 14 such as a flexible disk, an optical disk, or a memory card is insertable in the memory input/output device 12.

The musical operation device 2 is a keyboard for musical performance shown in FIG. 2 and it is capable of giving an instruction for generating and stopping musical sound at respective pitches by key operations. When the invention is applied to a non-keyboard type musical performance apparatus, the musical operation device 2 can be replaced by an operation device constituted by button keys, a various operation device including a percussion sensor, a touch sensor, or the like, and so on. The setting operation device 3 corresponds to keys 16 of various kinds provided on a panel 15 shown in FIG. 2, a not-shown pointing device, and so on, and is an operation device for making various kinds of settings of the musical performance apparatus 1, inputting data, and instructing the execution and termination of various kinds of processing.

Figure 3:
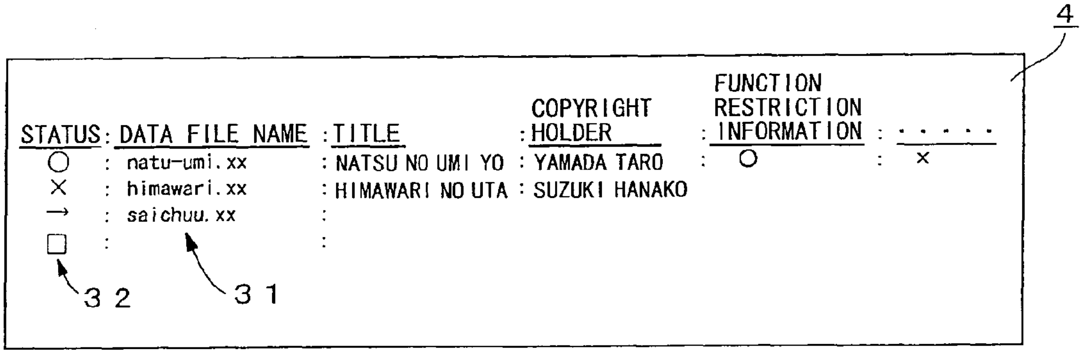
FIG. 3 is a view showing an example of display by a display device when a plurality of contents data are automatically and continuously downloaded by the musical performance apparatus.

The display device 4, which is a display device constituted by a liquid crystal display panel or the like provided on the panel 15 shown in FIG. 2, displays a musical performance status, various kinds of operation statuses, messages, and the like of the musical performance apparatus 1, and also functions together with the CPU 10 as a contents information display device. For example, the display device 4 can display detailed information on downloaded contents data and a download status thereof as shown in FIG. 3. The display contents shown in FIG. 3 will be described later.

The network interface 5 functions together with the CPU 10 as a contents data download device, and it is connected with a server 21 via a network 19 to transmit a command and user information to the server 21 and to receive contents data from the server 21.

The tone generator 6 generates a digital musical tone signal based on a musical operation by the musical operation device 2 or on automatic musical performance data, and outputs the musical tone signal to the sound system 7. The sound system 7 converts the inputted digital musical tone signal to an analog musical tone signal and amplifies it by a built-in amplifier, and the amplified analog musical tone signal is electro-acoustically transduced and outputted by a speaker 18 shown in FIG. 2.

The ROM 8, the RAM 9, the CPU 10, and the timer 11 constitute a microcomputer functioning as the signal processor. The CPU 10, which is a central processing unit, executes control programs stored in the ROM 8 and the RAM 9 to centrally control the operation of the musical performance apparatus 1. The CPU 10 also functions as respective devices (the contents data download device, a contents data memory device, a contents information analyzing device, an identifying information display device, and so on) according to the invention by utilizing functions of respective parts of the musical performance apparatus 1.

The ROM 8 is a memory storing various kinds of control programs executed by the CPU 10, data requiring no update, and the like. The RAM 9 temporarily stores various kinds of identifying information (data file name, restriction information, copyright information) relating to contents data and the contents data itself, and is also used as a work memory including various kinds of registers, flags, and the like necessary for the CPU 10 to execute the programs.

The timer 11 generates a clock pulse for triggering the CPU 10 to operate and outputs a timing signal for synchronization among the respective constituent parts of the musical performance apparatus 1 to play a role of time management of system operations.

The memory input/output device 12 is a rewritable, non-volatile memory device storing various kinds of application programs and contents data such as automatic musical performance data. The memory input/output device 12 may be a fixed-type memory device such as a hard disk drive (HDD) fixedly installed in the apparatus or a drive device (removable-type memory device) for a removable recording medium such as a flexible disk (FD), an optical disk (CD-R/W, DVD, and the like), or may be constituted by the both. It functions together with the CPU 10 as the contents data memory device to maintain the memory of the stored data such as contents data even after power is off.

Next, a configuration of the server 21 will be described. The server 21 includes, as shown in FIG. 1, a various operation device 22, a display device 23, a memory device 24, a network interface 25, a ROM 26, a RAM 27, a CPU 28, and a timer 29, and they are connected with one another by a system bus 30.

The various operation device 22 included in the server 21 corresponds to the setting operation device 3 included in the musical performance apparatus 1. It is constituted by buttons, keys, switches, and the like and is an operation device for inputting data, changing the setting of the server 21, and instructing the execution of various kinds of processing.

Further, the memory device 24 stores contents data such as musical performance data for transmission to a user. The network interface 25 performs transmission/reception when connected with the musical performance apparatus 1 via the network 19, to transmit various kinds of contents data in response to a request from the musical performance apparatus 1.

Other parts having the same names as those of the parts included in the musical performance apparatus 1 play the same functions as those of the respective parts of the above-described musical performance apparatus 1, and therefore, description thereof will be omitted.

Further, the network 19 connecting the musical performance apparatus 1 and the server 21 is assumed to be the Internet in this embodiment, but it may be physically constituted by, for example, a LAN, an optical cable, a typical telephone line, a leased line, or the like.

The following will describe an example of contents data that is downloaded by the musical performance apparatus 1 of this embodiment from the server 21 via the network 19. The contents data is tune data based on which the musical performance apparatus 1 performs a musical composition or generates musical sound thereof, and examples of a concrete data format are automatic musical performance data and musical score data in compliance with a MIDI (Musical Instruments Digital Interface: registered trademark) standard, musical sound compressed data in compliance with MP3, or the like.

The contents data of the tune data includes not only information relating to musical performance such as key-on/key-off and tones but also data related thereto.

Here, download will be described. The download refers to cooperative processing in which the server 21 transmits contents data in response to a request from the musical performance apparatus 1 being a client, the musical performance apparatus 1 reads the contents data via the network 19 to have the internal RAM 9 or other memory device store the read contents data. Further, as a form of such a download operation, an operation of requesting and downloading the contents data one by one separately is of course possible, but an operation of collectively requesting the plural contents data (for example, tune data of a plurality of musical compositions) and having the server 21 automatically and continuously transmit these data to download them is also possible.

Figure 4:
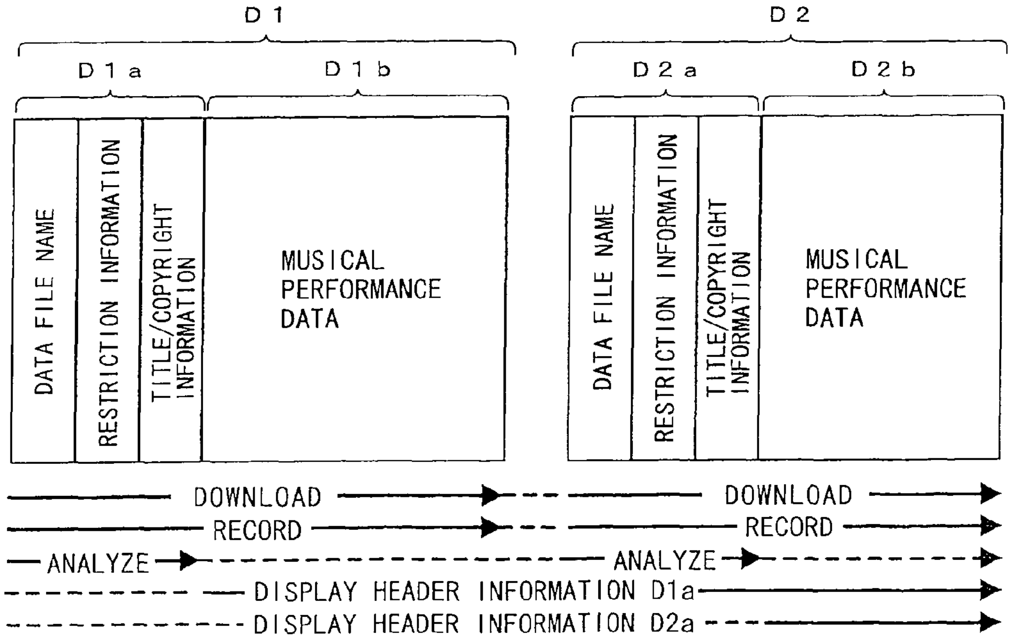
FIG. 4 is an explanatory view showing, in time series, the contents of data being read and the processing timings when the contents data are automatically and continuously downloaded.

As an example of this operation, FIG. 4 is a view showing, in time series, the contents of two contents data D1, D2 being read when these data are automatically and continuously downloaded. As shown in the drawing, the contents data D1, D2, whether in one of the aforesaid data format or the other, generally have a data structure such that a data file name, control information, and various reference information such as a title and copyright information of a musical composition are generally provided in a unit as header information D1*a*, D2*a* in a header portion at a head of each of the contents data D1, D2, and musical performance data (or compressed data) D1*b*, D2*b* being data main bodies follow the header information D1*a*, D2*a*.

In many cases, in determining necessity or not for downloading the contents data D1, D2, the necessity or not can be fully recognized by checking the aforesaid various reference information (for example, the data name or the title of the musical composition) included in the header information D1*a*, D2*a*, but in a conventional actual download operation, data distribution is automatically started from a server only by checking the data file name, and only the data file name is displayed on a client-side display device during the download. Such a data file name is generally expressed by a row of English characters and numerals, which makes it difficult to confirm the contents of the data. Therefore, even when a client spends a long time to complete the download without having sufficient recognition of the contents of the data, the download of another data has to be started over again from the beginning if the client thereafter notices that the file is mistakenly selected or is not necessary.

Therefore, the musical performance apparatus 1 being the contents managing apparatus according to the invention is structured such that, as shown in the heavy solid arrows in FIG. 4, the header information D1*a*, D2*a* are read and analyzed while the contents data D1, D2 are being downloaded, so that identifying information relating to the main body data is obtained. Then, while a read operation of the main body data D1*b*, D2*b* that follow the header information D1*a*, D2*a* is executed, the identifying information based on the header information D1*a*, D2*a* are displayed on the display device 4, so that the identifying information relating to the contents data that are being downloaded is provided to a user. Then, during long read processing of the main body data D1*b*, D2*b* occupying most of the contents data, the user can determine the continuation or discontinuation of the download, fully recognizing the contents of the data. Thus, the download operation of even the contents data with a large data size can be surely performed without any unnecessary download.

Incidentally, when a plurality of contents data are continuously downloaded, a download operation may be such that, instead of reading and analyzing the header information during the download of each contents data, the header information of one of the contents data or the header information and part of the main body data thereof is (are) read and analyzed as soon as the completion of the download of this contents data, while the plural contents data are being downloaded, and information relating to the contents data whose download has been first completed may be displayed immediately after the analysis or along with the download operation of the next contents data. Also in this operation, if the contents data first downloaded is not desired data, it is possible to recognize this immediately to start the download afresh.

Further, in the operation where the plural contents data are thus automatically and continuously downloaded, download progress statuses of the respective data are also preferably displayed. Accordingly, as soon as it is noticed that the contents data being downloaded is not necessary data, it is possible to cancel the download of this data to automatically shift to the download of next data, which can improve operation efficiency.

Next, processing operations involved in contents management by the musical performance apparatus 1 described with reference to FIG. 1 and FIG. 2 and by the server 21 installed on the Internet will be described with reference to the flowcharts in FIG. 5 to FIG. 8. In these flowcharts, a step for each processing is abbreviated as "S".

Figure 5:
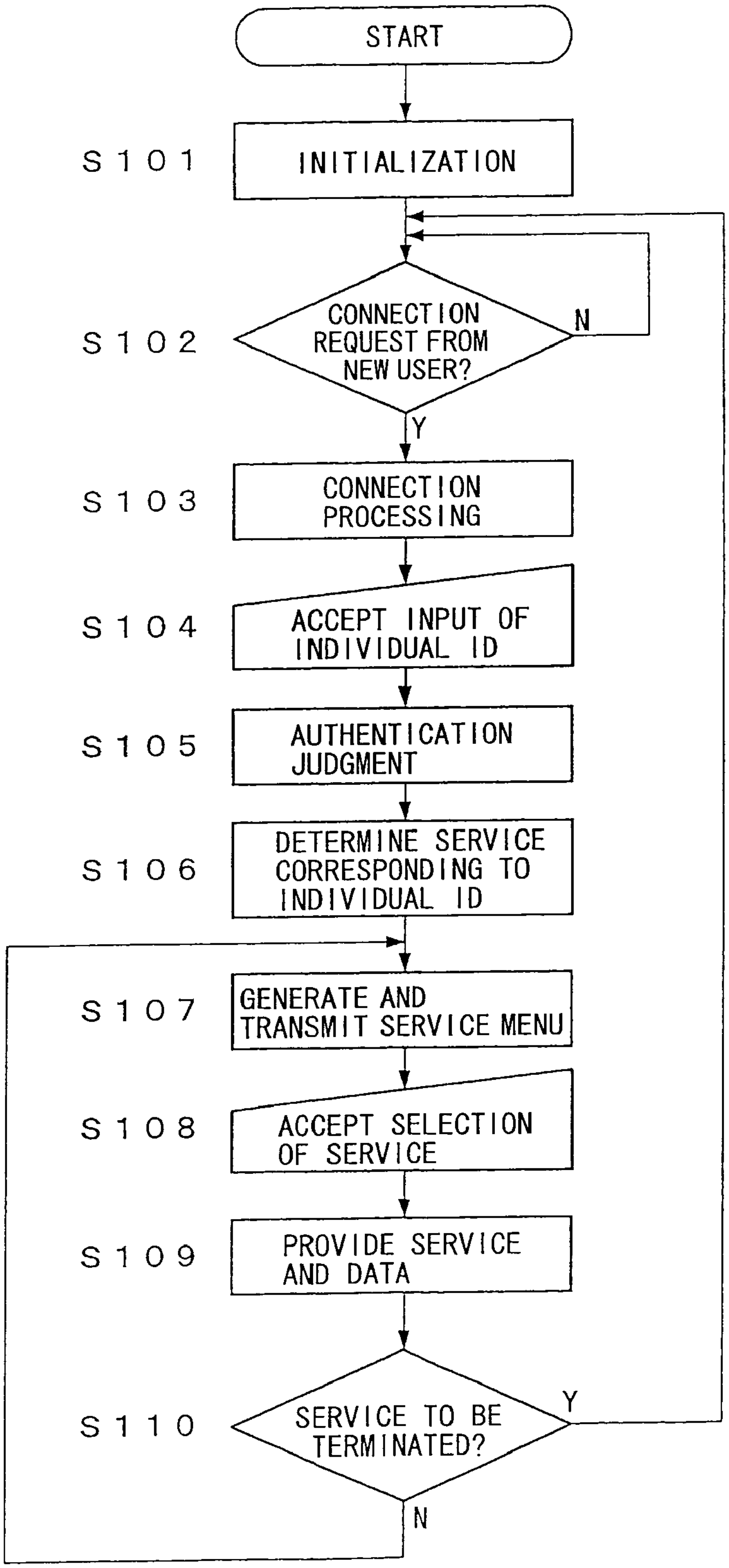
FIG. 5 is a flowchart of processing executed by a CPU of a server.

First, FIG. 5 is a flowchart showing processing executed by the CPU 28 immediately after power-on of the server 21 shown in FIG. 1, and an operation of the server 21 will be described based on this flowchart. Note that the processing shown in this flowchart corresponds to a processing procedure executed by the CPU 28 according to the control program stored in the ROM 26.

The CPU 28 of the server 21, when starting the processing shown in FIG. 5, first executes various initialization processing at Step 101. Specifically, the CPU 28 activates a predetermined program necessary for executing the server-side processing, initializes various parameters and data in the RAM 27, and makes initial setting to start connection with the network 19.

Next, the CPU 28 goes to Step 102 to check whether or not a connection request has been given from a new user (a client apparatus such as the musical performance apparatus) via the network 19, and keeps on standby at a monitor loop until this connection request is confirmed.

When the connection request from a new user is confirmed, the flow goes to Step 103, where the connection processing with this user is executed and at the same time, it is confirmed whether or not normal data transmission/reception to/from this user is possible. Then, an input of a user's individual ID (identifying information) transmitted from the user is accepted at Step 104, and user authentication is judged at S105.

The user's individual ID is an ID inputted by the user through an apparatus in use such as the musical performance apparatus, an automatically transmitted ID which was distributed previously (for example, a trial ID recorded in a free-sample medium) and stored in the apparatus used by the user or unique ID information stored in advance in the apparatus used by the user.

Next, the flow goes to Step 106, where the kind of service, the kind of data, and the like to be provided that match the contents of the individual ID are selected and determined. The matching may be matching with the kind of the apparatus used by the user, with the individual user, or with the combination of the both, and which matching is to be adopted in the service determination has to be set in advance at the time of ID registration or the like.

Thereafter, the flow goes to Step 107, where a service menu window is generated based on the determined service and data and transmitted to the user. At Step 108, an input of a service selection instruction from the user is accepted, and at Step 109, the selected service is provided. This service provision also includes the transmission of the data corresponding to the user or the apparatus used, and the download of the contents data is also executed in this processing. The service menu window when this download is executed is a download page, in which description on respective data to be downloaded are generally written.

Then, at Step 110, it is checked whether or not there exists an instruction for service termination from the user, and when the termination instruction is confirmed (including a case where non-input state lasts for a predetermined time), the connection with the user is cut off and the flow returns to Step 102, where a connection request from a new user is accepted. When a service request instead of the service termination request is confirmed at Step 110, the flow returns to Step 107, where a new service menu is generated and transmitted, and at Step 108, an instruction input is accepted.

The server 21 thus repeats the processing from Step 107 to Step 110 to continuously provide the service (continuously transmit data) to the connected user. Further, it repeats the processing from Step 102 to Step 110 to establish connection with a large number of users in sequence and continuously provide services that match requests of the respective users.

Figure 6:
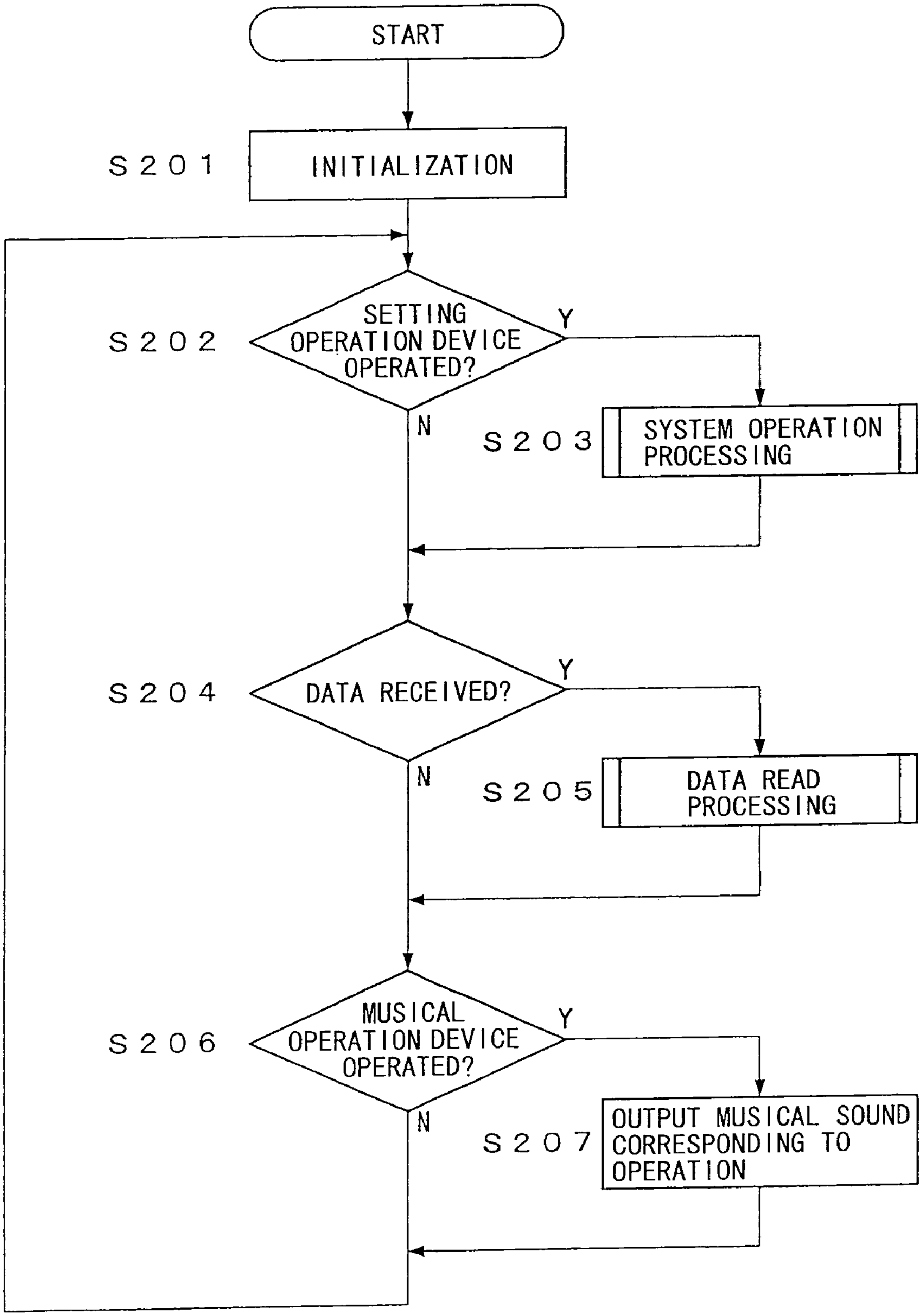
FIG. 6 is a flowchart of main routine processing executed by a CPU of the musical performance apparatus shown in FIG. 1.

Next, processing operations in the musical performance apparatus 1 being an apparatus used on a user side receiving service from such a server will be described. FIG. 6 is a flowchart showing main routine processing that is executed by the CPU 10 immediately after power-on of the musical performance apparatus 1 shown in FIG. 2. Note that the processing shown in this flowchart shows a processing procedure executed by the CPU 10 according to the control program stored in the ROM 8.

When the CPU 10 of the musical performance apparatus 1 starts this processing, activation of a predetermined program, initialization of various parameters and data, and so on are first executed in initialization processing at Step 201. Then, at Step 202, it is checked whether or not the user has operated the setting operation device 3. When the operation of the setting operation device 3 is confirmed, the flow goes to Step 203, where system operation processing (subroutine processing shown in FIG. 7) corresponding to this operation is executed, and thereafter the flow goes to Step 204. On the other hand, when the setting operation device 3 has not been operated, the flow goes directly to Step 204.

At Step 204, it is checked whether or not data has been received from the network 19. When data reception is confirmed, the flow goes to Step 205, where data read processing (subroutine processing shown in FIG. 8) is executed, and thereafter the flow goes to Step 206. On the hand, when data is not received, the flow goes directly to Step 206.

At Step 206, it is checked whether or not a keyboard being the musical operation device 2 shown in FIG. 1 and FIG. 2 is operated, and when the operation is confirmed, a musical tone signal corresponding to an operated key is generated and musical sound is outputted from the speaker 18 at Step 207. At this time, the tone generator 6 generates the musical tone signal, and the sound system 7 D/A converts and amplifies the musical tone signal and outputs the musical sound. By the processing at Step 206 and the processing at Step 207, the musical performance apparatus 1 functions as an electronic keyboard instrument. Then, when the operation of the musical operation device 2 is not confirmed at Step 206, and after the musical sound is outputted at Step 207, the flow returns to Step 202.

Then, the processing loop of the main routine from Step 202 to Step 207 described above is repeated, so that the system operation, the data read, and the electronic musical instrument function can be executed in parallel.

Next, the subroutine processing of the system operation processing executed at Step 203 in FIG. 6 will be described in detail with reference to FIG. 7.

Figure 7:
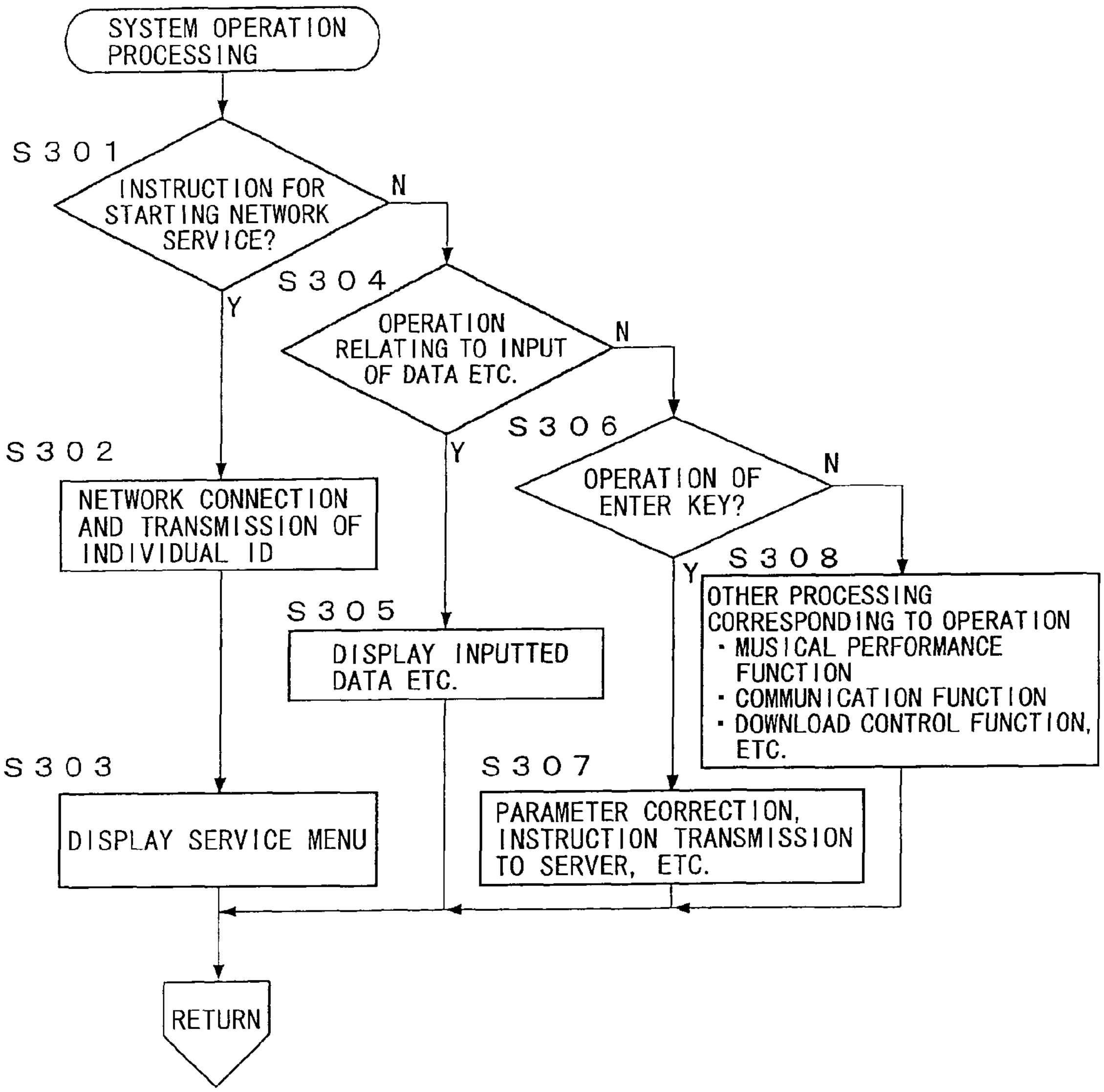
FIG. 7 is a flowchart of a subroutine of system operation processing in FIG. 6.

When the setting operation device 3 shown in FIG. 1 is operated, the subroutine processing shown in FIG. 7 is executed. In this processing, it is first checked at Step 301 whether or not the operation of the setting operation device 3 is an instruction for starting network service, and if YES, the connection with the network 19 is started, the target server 21 is accessed, and the individual ID is transmitted for receiving user authentication at Step 302. Thereafter, the flow goes to Step 303, where the service menu window received from the server 21 is displayed on the display device 4, and then the flow returns to the main routine in FIG. 6.

When it is judged at Step 301 that the operation is not the instruction for starting the network service, the flow goes to Step 304, where it is checked whether or not the operation is an operation relating to an input of data or the like. Then, if YES, the flow goes to Step S305, where data such as a character corresponding to the input operation is displayed at a predetermined position of a screen of the display device 4, and if the operation is an operation with a pointing device, display of the movement of a cursor according to the movement of the pointing device, change of window display, and the like are executed, and then the flow returns to the main routine in FIG. 6.

When it is judged at Step 304 that the operation is not the input operation of data or the like, the flow next goes to Step 306, where it is checked whether or not the setting operation device 3 that is operated is an enter key such as an execution key or a return key. Then, if YES, the flow goes to Step 307, where processing such as parameter correction and transmission of data or an instruction to the server is executed in response to the operated enter key, based on data and setting that have been inputted so far. Here, if the operation of the enter key is an instruction for starting download, the instruction to that effect is transmitted to the server 21 to start the download operation. Thereafter, the flow returns to the main routine in FIG. 6.

When it is judged at Step 306 that the operation is not the operation of the enter key, the flow goes to Step 308, where other processing corresponding to the operation of the setting operation device 3 is executed. For example, functions generally performed in musical performance apparatuses and communication apparatuses are executed in this processing. Specifically, musical performance data already stored is selected for musical performance or editing, or a position of a folder to record the downloaded data is designated. Note that processing for terminating the download while the data is being downloaded is also executed at this Step 308, and if a plurality of data are being collectively downloaded, it is possible to select whether the download of individual data is separately terminated or the download of all the data is collectively terminated. After the processing at Step 306, the flow also returns to the main routine in FIG. 6.

Next, the subroutine of the data read processing executed at Step 205 in FIG. 6 will be described in detail with reference to FIG. 8. Note that the network 19 utilized for data transfer is assumed to be the Internet in this embodiment, and therefore, data is in a state of being divided into packets when it is read. That is, the judgment on whether or not data has been received at Step 204 in FIG. 6 and the data read processing to be described below are executed only for packets that have been read so far. Further, a known technique can be applied to packet exchange between the network interface 5 and the CPU 10 shown in FIG. 1, and therefore, description thereof will be omitted here.

Figure 8:
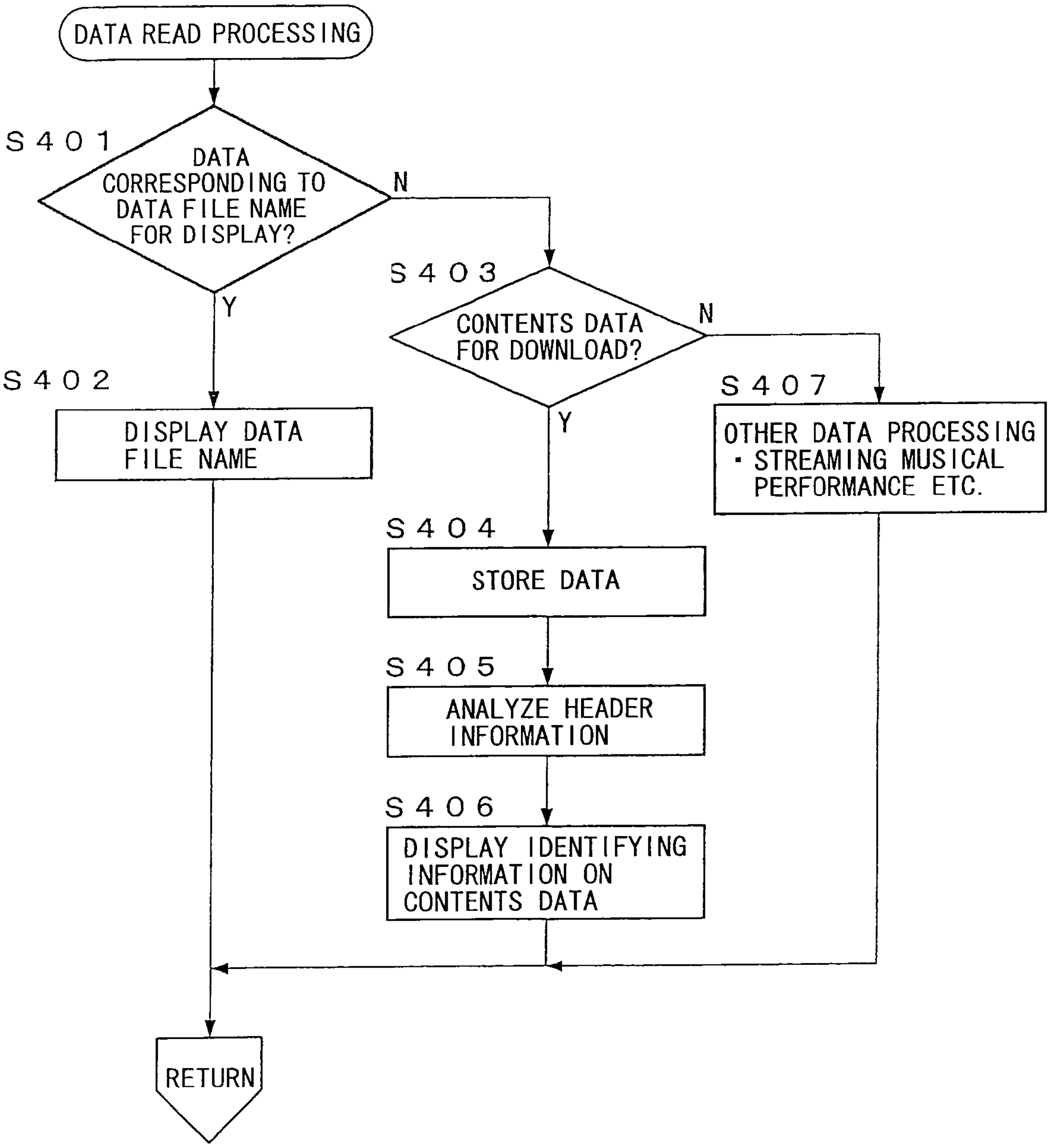
FIG. 8 is a flowchart of a subroutine of data read processing in FIG. 6.

The data read processing shown in FIG. 8 is executed when the data reception is confirmed in the main routine processing in FIG. 6. In this processing, it is first checked at Step 401 whether or not the received data (packet) is data corresponding to the data file name for display, and if YES, the data file name is displayed at a predetermined position of the display device 4 at Step 402, and then the flow returns to the main routine in FIG. 6. If the operation at this time is an operation of automatically and continuously downloading a plurality of contents data, the plural data file names are displayed as a list in parallel.

When it is judged at Step 401 that the received data is not the data corresponding to the data file name for display, the flow goes to Step 403, where it is checked whether or not the received data is contents data for download.

Then, when the received data is contents data for download, the flow goes to Step 404, where the data is read and stored in the recording folder designated in advance at Step 308 in FIG. 7. Further, at Step 405, the header information included in the data is analyzed, so that identifying information relating to the contents data is extracted, and it is judged whether or not the identifying information is effective as information to be provided to the user. Then, at Step 406, the identifying information (title of a musical composition, copyright holder, function restriction information, and so on) judged as effective is displayed at a predetermined position on the screen of the display device 4, and thereafter, the flow returns to the main routine in FIG. 6.

When part of the contents of the main body data of the contents data includes information such as the title of the musical composition, this information as well as the header information is preferably read for analysis.

Note that in this example, the processing at Step 405 and the processing at Step 406 are executed at an instant when the read of the header information portion included in the contents data is completed. Specifically, when two contents data are automatically and continuously downloaded, the analysis of the header information and the display of the identifying information of the contents data based on the result of the analysis are executed at timings shown by the heavy-line arrows for “analysis” and “header information display” shown in FIG. 4.

Further, the display when the plural contents data are automatically and continuously downloaded is, for example, as shown in FIG. 3. At head positions of respective data file names 31 displayed as a list, symbols 32 representing progress statuses of the download of the respective data are displayed. In the case of the automatic continuous download shown in FIG. 3, the statuses such as “○: download completed”, “X: failed/cancelled”, “→: downloading”, and “□: not yet downloaded” are displayed for the data in the reading order.

Consequently, the user can confirm details of the respective contents data, and can also discriminate which data is being currently downloaded, so that it is possible to immediately discontinue and cancel the download of data judged as unnecessary to immediately shift to the download of next data, which can improve efficiency of the whole download operation. Note that the discontinuation processing of the download is executed at Step 308 in FIG. 7.

When it is judged at Step 403 that the received data is not the contents data for download, processing corresponding to data of other kind is executed at Step 407. An example of the data of the other kind is data for streaming, and in this case, data being read is not stored but streaming musical performance or the like in which the data is reproduced in real time is executed. After the data processing at Step 407, the flow also returns to the main routine in FIG. 6.

In the data read processing described above, Step 404, Step 405, and Step 406 correspond to functions of the contents data memory device, the contents information analyzing device, and the identifying information display device, respectively.

Executing the above-described contents management processing enables the musical performance apparatus 1 of this embodiment to display the identifying information relating to the contents data even while the contents data is being downloaded. Therefore, it is possible to discontinue the download of mistaken data at an early stage, which enables a reliable and efficient download operation.

Incidentally, the signal processor constituted by the CPU 10, the ROM 8, the RAM 9, and the timer 11 of the musical performance apparatus 1 shown in FIG. 1 constitutes a microcomputer. The programs shown in the flowcharts in FIG. 6 to FIG. 8 are programs for causing this computer to execute the processing of downloading the contents data, the processing of storing the contents data, the processing of analyzing the contents data to obtain the identifying information, and the processing of displaying the identifying information, so that these parts operate in cooperation with the other parts to function as the contents managing apparatus according to the invention. The programs can be stored in advance in a ROM or the like.

Alternatively, it is also possible that the programs are provided, being recorded in a nonvolatile recording medium such as a CD-ROM or a flexible disk, and the CPU 10 controls a disk drive of the memory input/output device 12 to read the programs from the recording medium to the RAM 9 for execution. Further, the same effect is obtainable when the programs are stored in a memory device such as a hard disk drive (HDD), or is downloaded from an external device to be executed.

When a general-purpose personal computer or the like functions as the contents managing apparatus according to the invention, it is a matter of course that the programs according to the invention stored in the recording medium are downloaded or the programs according to the invention transmitted from the external device are downloaded for use.

Incidentally, the above description shows the example where the plural contents data are automatically and continuously downloaded in sequence when these data are collectively downloaded, but besides, it is also possible to designate each of the plural data to download them separately, or to download the plural data in parallel simultaneously.

In these cases, it is also possible to analyze the header information portion of each data as soon as the read of the header information portion is completed and display the identifying information relating to each contents data, or display the download progress statuses of the respective contents data together. Consequently, it is possible to immediately discontinue the download of data judged as unnecessary, which can lighten load of necessary download processing, resulting in improved efficiency of the whole download operation.

Further, in the above description, the contents data is downloaded from the server via the Internet, thereby enabling acquisition of the latest data, but the contents data may be downloaded from a removable recording medium such as a flexible disk or a CD-ROM. In this case, the facility such as the network or the server is not necessary, which makes it possible to download the contents data with a simple configuration.

Further, the case where the contents data to be downloaded is tune data whose contents are not visually recognized is taken as an example in the above description since the invention is effective especially for such a case. However, the invention is also effective for image data and program data, and since they generally have a very large data size, applying the invention thereto can achieve a great improvement in efficiency of the download operation.

Further, in the above description, the contents data arbitrarily selected from the service menu by the user is downloaded, but the contents managing apparatus according to the invention is also applicable to a case where there is a function of automatically downloading the contents data when a predetermined condition such as the elapse of a predetermined time is satisfied. The display of the identifying information relating to the contents data during the download is especially effective for such a case since the user does not fully recognize the downloaded data in this case.

Further, the identifying information of the contents data is obtained as a result of the read of the header information disposed in the header position, but the identifying information may be obtained by reading and analyzing information disposed in the middle of the contents data, and if the identifying information is displayed based on the analysis of necessary data as soon as it is read, user's quick confirmation is enabled.

Further, the above-described embodiment describes the example where the invention is applied to the musical performance apparatus constituted by the electronic keyboard instrument, but the invention is similarly applicable also to other electronic musical instruments having no keyboard, a general-purpose personal computer, a portable terminal device such as a cellular phone, an on-line karaoke machine, and so on.

The invention can be utilized for various kinds of apparatuses downloading contents data such as tune data for utilization from an external device such as a server, directly from a recording medium, or via communication means such as a network. Examples of such devices are musical performance apparatuses such as various kinds of electronic musical instruments including a synthesizer, a general-purpose personal computer having a musical performance function, portable terminal devices such as a cellular phone, an on-line karaoke machine, and so on. It becomes possible to surely and efficiently download contents data, so that efficiency of the download operation can be enhanced even when the data size of the contents data is large or when the read speed in the download is low.

What is claimed is:

1. A contents managing apparatus comprising:

a contents data download device configured to download a plurality of contents data continuously in sequence, each including musical performance data and header data identifying at least contents of the respective musical performance data and usage restriction information;

a non-volatile storage device for storing the downloaded contents data;

a contents information analyzing device configured to read and analyze the header data of each of the plurality of contents data as soon the header data is downloaded while the respective musical performance data thereof is being downloaded by said contents data download device to thereby obtain identifying information relating to the contents data; and an identifying information display device that displays the identifying information, including the usage restriction information, obtained by said contents information analyzing device, and download statuses of the plurality of contents data, wherein the displayed identifying information allows a user to determine whether to complete or cancel downloading of the respective musical performance data associated therewith, while continuing with downloading of the remaining contents data.

2. A contents managing apparatus according to claim 1, wherein said contents data download device downloads the contents data from a server via the Internet.

3. A contents managing apparatus according to claim 1, wherein said contents data download device downloads the contents data from an external device connected with the contents managing apparatus.

4. A contents managing apparatus according to claim 1, wherein the musical performance data is tune data.

5. A contents managing apparatus according to claim 4, wherein the tune data is MIDI data.

6. A contents managing apparatus according to claim 1, wherein said non-volatile storage device is one of a fixed-type memory device having a built-in recording medium or a removable-type memory device to/from which a recording medium is attachable/removable.

7. A contents managing apparatus according to claim 1, wherein said contents data download device is configured to automatically download the contents data when a predetermined condition is satisfied.

8. A computer-readable medium storing a computer program executable by a computer, the computer program containing program instructions for:

downloading a plurality of contents data continuously in sequence, each including musical performance data and header data identifying at least contents of the respective musical performance data and usage restriction information;

storing the downloaded contents data in a non-volatile storage device;

reading and analyzing the header data of each of the plurality of contents data as soon as the header data is downloaded while the respective musical performance data thereof is being downloaded to thereby obtain identifying information relating to the contents data; and displaying the obtained identifying information, including the usage restriction information, and download statuses of the plurality of contents data, wherein the displayed identifying information allows a user to determine whether to complete or cancel downloading of the respective musical performance data associated therewith, while continuing with downloading of the remaining contents data.

9. A contents managing apparatus according to claim 1, wherein the header data further includes a name of the musical performance data and copyright information, and the usage restriction information includes at least one of a number of times of copying or reproducing, restriction on display of musical score, or edit restriction.

10. A computer-readable medium according to claim 8, wherein the header data further includes a name of the musical performance data and copyright information, and the usage restriction information includes at least one of a number of times of copying or reproducing, restriction on display of musical score, or edit restriction.

* * * * *

UNITED STATES PATENT AND TRADEMARK OFFICE

CERTIFICATE OF CORRECTION

PATENT NO. : 7,765,314 B2
APPLICATION NO. : 11/182921
DATED : July 27, 2010
INVENTOR(S) : Tetsuo Okamoto It is certified that error appears in the above-identified patent and that said Letters Patent is hereby corrected as shown below:

In Claim 1 column 12, Line 39 -- as -- should be inserted between "as soon" and "the header"

REMOVE: AS SOON THE HEADER

INSERT -- AS SOON AS THE HEADER --

Signed and Sealed this

Thirtieth Day of November, 2010

David J. Kappos

*Director of the United States Patent and Trademark Office*